Jan. 30, 1968   A. M. J. BELLIER   3,366,189
SYSTEM FOR WEIGHING LOADS IN MOTION
Filed Feb. 8, 1965   3 Sheets-Sheet 1
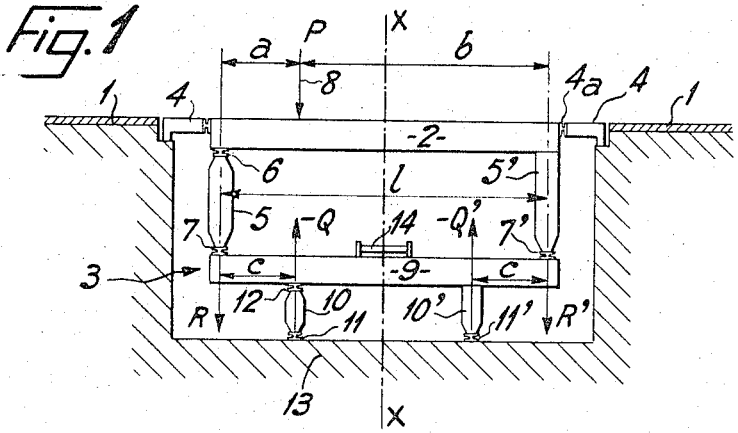
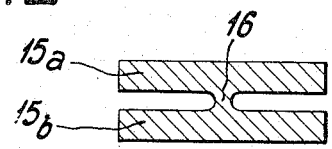
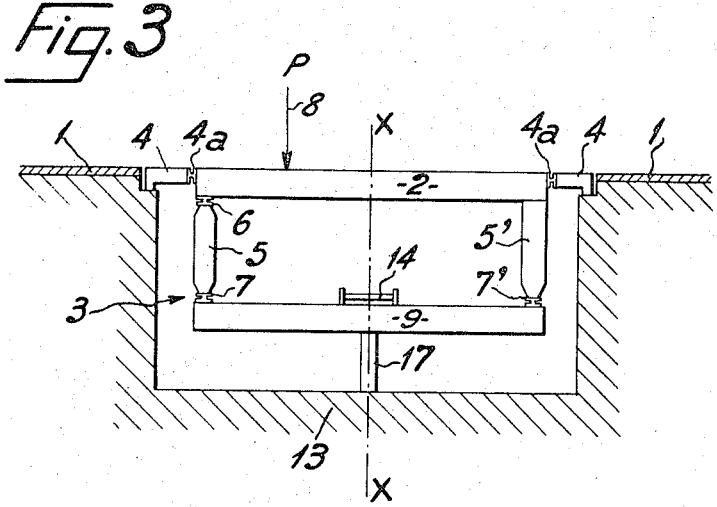

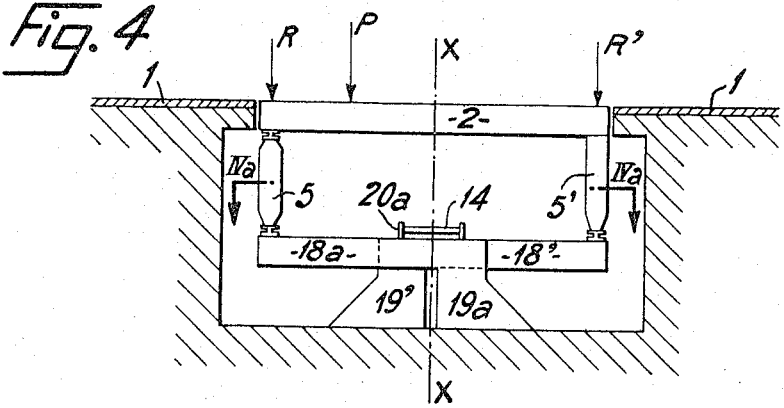
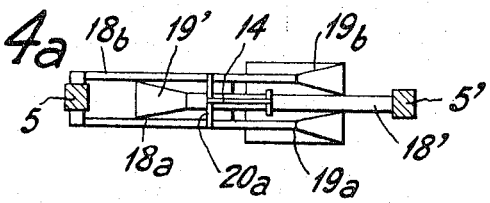
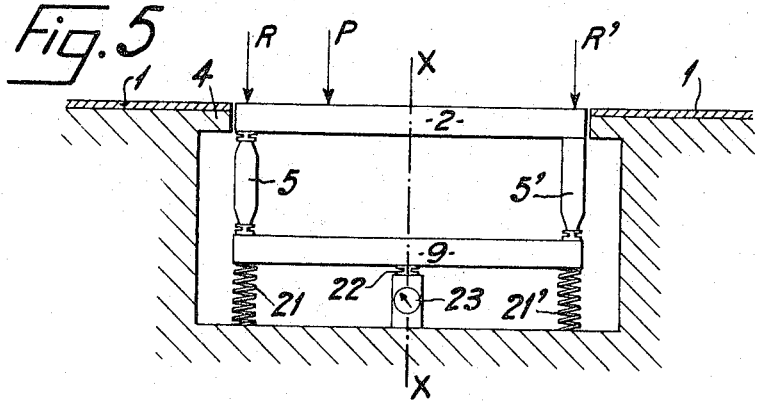
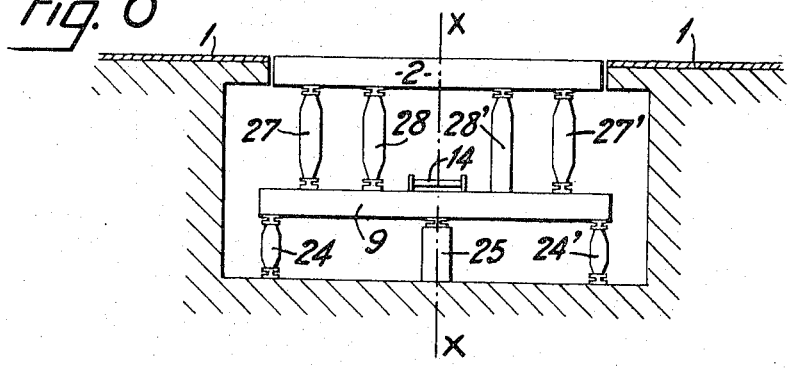

Jan. 30, 1968  A. M. J. BELLIER  3,366,189
SYSTEM FOR WEIGHING LOADS IN MOTION
Filed Feb. 8, 1965  3 Sheets-Sheet 3
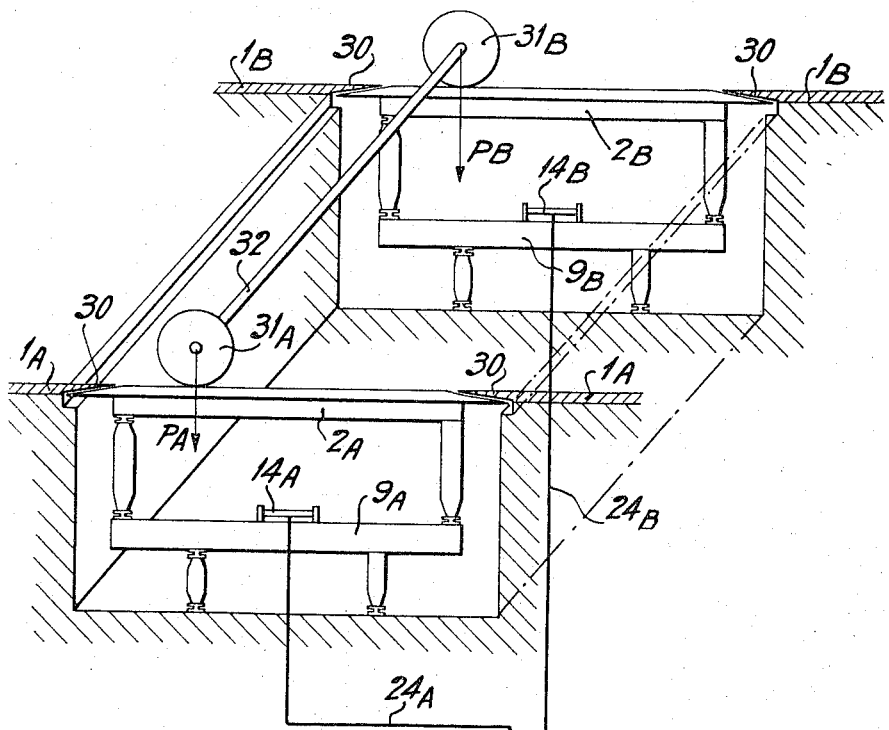
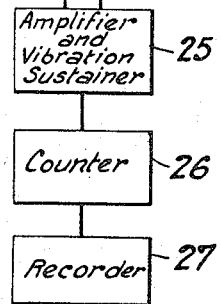
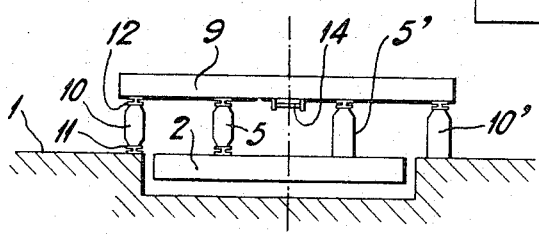

United States Patent Office 3,366,189
Patented Jan. 30, 1968

3,366,189
SYSTEM FOR WEIGHING LOADS IN MOTION
Anselme M. J. Bellier, 5 Ave. de Villeneuve,
Garches, France
Filed Feb. 8, 1965, Ser. No. 430,968
Claims priority, application France, Feb. 13, 1964,
963,681
6 Claims. (Cl. 177—134)

ABSTRACT OF THE DISCLOSURE

An apparatus for weighing moving loads, such as the wheel loads on railroad cars while they are in motion, said apparatus comprising a load-carrying frame positioned in a recess of the roadway along which the vehicle is to move, said frame comprising first and second beams, the first of said beams being positioned at the roadway level as a continuation thereof across said recess, the second beam extending parallelly below the first and being connected thereto by a first load-bearing strut means, the second beam being supported at a distance from the bottom of the recess by a second load-bearing strut means extending between the bottom of the recess and said second beam, the respective strut means being symmetrically arranged relative to a central axis extending between said beams, a strain gauge attached to the second beam symmetrically relative to said axis.

---

This invention relates to apparatus for weighing moving loads, and more especially weighing the wheel loads of vehicles, such as railroad cars, while in motion over a track.

The need for determining the wheel loads of vehicles in motion without arresting the motion of the vehicles arises frequently both in railroad work and in other fields of engineering. The weighing systems heretofore used for such purposes have generally included an elastically deformable member interposed in an interruption of the track followed by the vehicles, and force-measuring means associated with said member to indicate the deformation thereof in response to the load of a vehicle wheel moving over it. Such prior devices have often lacked reliability because of the relatively short duration of the time period over which the deformable member was exposed to the action of the load. Because of the briefness of this period, there was not enough time for the response to attain a steady state, so that the true response to the static load tended to be obscured by the dynamic responses due to the impacts at the instant the vehicle wheels first engaged the deformable member, and disengaged the deformable member. The resulting measurements therefore lacked accuracy and sensitivity.

An object of this invention is to provide apparatus for weighing loads in motion, which will be free of the above defects in that it is constructed to deliver a steady response of theoretically unlimited duration, and which will consequently be a substantially true measure of the static loads moving over it.

An object is to provide apparatus for weighing moving loads such as the wheel loads of railroad and other vehicles, which will be relatively simple and sturdy and easy to maintain, being constructed from few parts, and which will be capable of delivering a prolonged, steady, output continuously corresponding to the load moving over it regardless of the position of the load upon the apparatus throughout the length of said apparatus, which may be considerable if this is desired.

Other objects include the provision of such apparatus the operation of which will only involve extremely small-amplitude displacements or deformations of an elastic character measurable by conventional strain-gauge techniques wherein undesired dynamic effects will be reduced to a minimum, which will not be prone to maladjustment and will retain its initial accuracy and sensitivity over very long periods of use and a great many weighing cycles.

Other objects and advantages of the invention will become apparent as the disclosure proceeds.

Apparatus for weighing moving loads according to this invention may comprise, in an important aspect thereof, a ground-supported track along which a load is movable and having an interruption therein, a carrier beam of substantial length interposed in said interruption and arranged for a load to ride over therealong in substantial continuity with the movement of the load along the track ahead of and beyond the interruption, an elastically deformable weighing means, such as a second beam parallel to and vertically spaced from the carrier beam, means connecting said weighing means with ground and with the carrier beam for the transfer of forces from the beam to the weighing means and thence to the ground, said carrier beam, weighing means and connecting means being symmetrically arranged with regard to a vertical plane of symmetry transverse to the direction of load movement, and strain-gauge means connected with said weighing means for indicating the deformations thereof at said plane of symmetry in response to a load moving along the beam, whereby the indications will be a function of said load substantially independently of the load's position along the carrier beam, i.e. will remain constant throughout the period the load is moving over the substantial length of the beam.

Exemplary embodiments of the invention will now be described with reference to the accompanying diagrammatic drawings, in which like reference numbers are used to designate like parts in all of the embodiments.

FIG. 1 is a schematic view, as seen in a vertical plane parallel to the direction of load movement, of a first weighing apparatus according to the invention.

FIG. 2 is a larger-scale sectional view of a hinging element advantageously used in the invention.

FIG. 3 is a similar to FIGURE 1 but shows a different embodiment.

FIG. 4 similarly illustrates a further modification.

FIG. 4a is a plan view on the line IVa—IVa of FIGURE 4.

FIG. 5 shows a further embodiment.

FIG. 6 shows yet another embodiment.

FIG. 7 is a schematic perspective view of a system for weighing the two opposite-side wheel loads of a vehicle; and FIG. 8 illustrates yet another embodiment of the invention.

Referring to FIGURE 1, weighing apparatus according to a first embodiment of the invention is shown interposed along a track 1. It will be understood that the track 1 may constitute any type of runway along which vehicles or other heavy objects to be weighed during displacement are adapted to move. Thus the track 1 may be a railroad track, or it may be a road surface, or any other kind of runway.

For the purposes of the invention the track 1 is shown as being interrupted to provide a pit or excavation 3 in which the weighing structure to be described is positioned. Said structure includes a rigid horizontal carrier beam 2 having its upper horizontal surface level with the surface of track 1. The beam 2 has its ends spaced from the edges or banks of the excavation 3 by short gaps sufficient to provide clearance for the freedom of deformation (including temperature expansion) of the beam 2. As here shown, the gaps at each end of the beam 2 are bridged by respective bridging members 4 to restore continuity for smooth travel of the vehicles over the structure and prevent undesirable impacts on entry of the vehicles on and departure thereof from the structure. The bridging members 4 may, as shown, have their one ends pivoted to the respective ends of beam 2 as at 4a and have their other ends resting freely on the edges of the embankments, so as to avoid transfer of any reaction forces from the tracks 1 to the beam 2.

The carrier beam 2 is supported by means of two load-bearing legs or strut members 5 and 5' depending from its under side. The legs 5, 5' are symmetrically positioned to opposite sides from the median vertical axis $xx$ of the beam 2 and weighing structure, and in this embodiment said legs 5, 5' are positioned below the ends of the beam. One of the two legs, here leg 5, has its upper end hinged or pivoted at 6 to the under side of beam 2, whereas the other leg 5' is here shown as being rigidly fixed with the beam, for reasons that will appear later.

A lower horizontal beam 9, which constitutes the weighing member proper, is disposed beneath the upper or carrier beam 2, and has its ends connected by hinges 7 and 7' with the lower ends of the respective legs 5 and 5'. The lower beam 9 in turn is supported from the bottom of pit 3 by means of two depending load-bearing legs or strut members 10 and 10'. These legs are disposed at symmetrical positions to opposite sides from the central axis $xx$ of the weighing structures, as are the legs 5 and 5', but it will be observed that the legs 10 and 10' are horizontally spaced from the respective upper legs 5 and 5', in this case inward of the structure. The lower legs 10 and 10' have their upper ends connected to the beam 9 respectively through a hinged connection 12 and through a fixed connection as shown. Both legs 10 and 10' have their lower ends supported on hinges 11 and 11' respectively, upon the bottom of the excavation 3.

A strain gauge device 14 is attached to the lower beam 9 in the central area thereof around the centre axis $xx$, so as to sense the flexional deformations of the beam 9 in its top portion.

Consider a load P applied by the wheel of a vehicle (or other load to be weighed) positioned on the upper beam 2 at the point indicated by the vertical arrow 8, at the distances $a$ and $b$ from the respective ends of said beam, as shown. Let $l$ equal the common length of the beams 2 and 9, and $c$ the common distance between either of the upper supporting legs 5, 5' and the related lower supporting legs 10, 10' (see the figure).

The vertical load P is transferred through the upper legs 5, 5' to the lower beam 9 as the two vertical downward forces R, R' such that $$R+R'=P \qquad (1)$$

These forces R and R' are in turn transferred by way of the lower beam 9 and lower legs 10, 10' to the ground as the two vertical forces Q and Q', such again that $$Q+Q'=R+R'=P \qquad (2)$$

and it will be noted that the reaction forces applied from the ground to the lower beam 9 at the points 12, 12' are hence respectively equal to $(-Q)$ and $(-Q')$.

The bending moment M developed at the midpoint of the lower beam 9 and acting on the strain gauge 14, can be computed as being due either to the combined leverage of the left-hand forces R and $-Q$, or as being due to the combined leverage of the right-hand forces R' and $-Q'$, and it obviously has the same value in either case. We thus get the two equations $$M=R\frac{1}{2}-Q\left(\frac{1}{2}-c\right)$$

$$M=R'\frac{1}{2}-Q'\left(\frac{1}{2}-c\right) \qquad (3)$$

By adding the two Equations 3 we obtain $$2M=(R+R')\frac{1}{2}-\frac{1}{2}(Q+Q')+c(Q+Q')$$

and the substitution into this last equation of the relations 1 and 2 yields.

$$M=\frac{c}{2}P \qquad (4)$$

This relation shows that the bending moment developed at the centre of the weighing beam 9 and acting on the strain gauge 14 is independent of the position of the loan P acting on the carrier beam 2, and hence remains constant throughout the movement of such load over the weighing structure. The resulting measurement is therefore a true representation of the static load.

As a matter of fact, if the movement of the load occurs with uniform velocity (without acceleration or deceleration) all the forces remain vertical and owing to the hinged connections the beams 2 and 9 deform under load independently of one another. If acceleration or deceleration ocrurs when the load P passes on the beam 2, or if, for any reason, a horizontal force appears during displacement of the load on the beam 2, owing to the rigid connections of the beams 2 and 9 respectively with the legs 5' and 10', the device remains stable and opposed horizontal forces are evolved in the hinged connection 7' and 11', but the bending moment M remains unchanged.

Hence, the substitution of fixed for hinged joints at a minimum number of suitably selected points of the system, as shown, avoids the use of vertical guide means for maintaining the stability of the device and does not detract from the isostatic character of the system and from the accuracy of the equations as given above, especially if the hinged connections such as 6, 7 and 12 are arranged to be positioned close to the neutral fibres of the respective beams 2 and 9.

FIG. 2 illustrates a convenient form of hinge connecting member usable according to the invention at any of the above mentioned connecting points between components of the system. The hinge member shown comprises a block of a suitable metal, e.g. cast steel, of generally rectangular parallelopipedic form. Two aligned slots are cut into opposite sides of the block so as to leave a relatively narrow neck 16 between the inner ends of said slots, which inner ends are preferably rounded as shown. The block thus assumes the general form of an H, with thick opposite legs 15a and 15b interconnected at their centres by the neck or crossarm 16. Each of the legs 15a and 15b is, in use, fixedly secured as by welding or bolts to a related one of the two parts of the structure that are to be hinged together. It is found in use that the thickness of the neck 16 can be readily determined, in conjunction with the dimension of the block perpendicular to the plane of the drawing so that with the loads in the range that are developed in operation, the two legs 15, 15a together with the components secured thereto, will rock with respect to each other about the centre of the neck 16 as a centre of rotation, to the limited angular extent permitted by the width of the slots. Said width should therefore be selected so as to permit the maximum angular movements that will occur in normal operation. For loads in excess of normal, positive abutment between the adjacent ends of the legs will occur and such excessive loads will therefore not be transferred through the device. In some cases it may be advantageous to depart from the symmetrical configuration shown in FIG. 2, as for example by making one of the slots wider than the other, and/or making one or both of the legs 15a, 15b shorter at one side of the device than at the other.

FIG. 3 illustrates a different embodiment of the invention. The structure there shown can be derived from the structure of FIG. 1 by reducing the distance between the two lower legs 10 and 10' (FIG. 1) to zero, until both legs coincide and constitute a single central supporting leg 17 (FIG. 3). This central leg 17 is rigidly fixed at top and bottom to the lower beam 9 and the ground. It will be clear that this system operates in a manner exactly similar to that of FIG. 1, and the strain gauge 14 will again provide a measure of the load P regardless of the position of said load longitudinally of the structure. In this case the indication of the strain gauge will be related to the load P in accordance with the equation $M = P\frac{1}{2}$ instead of the relation $M = Pc/2$ (4) derived in the case of FIG. 1.

It is apparent from FIG. 3 that the structure there shown, in order to be stable, requires that the single central supporting leg 17 be made with great rigidity both throughout its length, and at both its points of attachment. Such a structure can only be used with relatively low values of load P, since otherwise the column 17 would have to be made inordinately wide in its transverse dimension in the plane of the drawing. The strain in the central part of the beam 9 would then be somewhat indeterminate and the strain gauge 14 would lack sensibility. Thus the system of FIG. 3 is preferably used for the measurements of relatively low loads.

However the apparatus of FIG. 3 may be modified to overcome the defect just indicated and permit measuring high loads. One way of arriving at this result would be to connect the ends of the strain gauge 14 with spaced points of the lower beam 9 displaced in opposite directions from the central vertical plane $xx$. Another method is to modify the apparatus of FIG. 3 in the manner illustrated in FIGS. 4 and 4a. In this embodiment, the lower beam 9 and its lower supporting legs constitute an assembly constructed in the following manner.

There is provided a first integral console or bracket member which includes a broad base leg 19' and a cantilever beam section 18' projecting from the top of leg 19' to provide one half of the lower beam heretofore designated 9. There is also provided a pair of integral console or bracket members which each include a broad base or leg 19a or 19b, and a cantilever beam section 18a or 19a projecting therefrom together to provide the other half of the lower beam. As shown, the two consoles 18a–19a and 18b–19b are disposed in parallel spaced relation on opposite sides of the single console 18'–19', with the cantilever part 18' projecting in one direction and the cantilever parts 18a–18b projecting in the opposite direction. The flexional characteristics of the two beams 18a–18b together, are made equivalent to the flexional characteristics of the single beam 18', as by making each of the former beams twice as narrow as the latter beam. The strain gauge 14 has one end connected to the cantilever portion 18' and its other end connected to a crossbar 20a mounted across the two cantilever portions 18a and 18b. In this manner it will be apparent that the fixed sections of the respective cantilever beam portions 18', 18a and 18b can be made to lie both substantially on the midplane XX, without however imposing any limitation on the width of the bases 19', 19a and 19b, and the structure can therefore be made as stable as required for use with large loads.

A somewhat simpler alternative construction would be to provide only two, similar, consoles such as 18'–19', with their cantilever beam portions 18' projecting in opposite directions. However, such a construction would involve the presence of an undesirable twisting moment.

In the further embodiment of FIG. 5, the lower support structure comprises a central support 23 constituted as a compressional strain-gauge or compression dynamometer. The centre of beam 9 is pivoted to the top of this support 23 by means of a hinge 22. At both ends, the lower beam 9 is supported on two elastically deformable supports 21 and 21' here schematically shown as coil springs for clarity. It can be shown that with such an arrangement, the compressional force indicated by the central dynamometer 23 is a function of the load P applied to the upper beam 2 regardless of the position of the load as with the arrangements first described. Specifically, it will be shown that the compression load C acting on the central support 23 and indicated by the dynamometer is of the form $$C = (1+\alpha)(R+R') \qquad (5)$$

where $\alpha$ is a coefficient between 0 and 1, which depends on the nature of the flexible supports 21 and 21'. Equation 5, by virtue of Equation 1, can be rewritten $$C = (1+\alpha)P \qquad (6)$$

which states that the compressional load on the dynamometric central support 23 is proportional to the load P regardless of the load's position.

The truth of relation 5 can be established as follows.

It is assumed that the flexibility of beam 2 is negligibly low in comparison to that of the flexible end supports 21 and 21'. It will also be assumed, as a first boundary instance, that the end supports 21, 21' are capable of elastic deformation in compression only, but provide a positive rigid abutment for each end of the beam 9 in the upward direction. In these conditions, it follows immediately from the well-known mechanics of levers that the compressional load on the centre support 23 is twice the sum of the end loads R and R', i.e.

$$C = 2(R+R') \text{ or } C = 2P \qquad (7)$$

Now taking the reverse boundary hypothesis, i.e. that the end supports 21 and 21' yield with equal spring rates both to tension and compression forces, then the corresponding reaction forces will always be equal in intensity and opposed, so that their sum will be zero, and the compression load on the dynamometer support 23 will be just equal to the sum $$(R+R'), \text{ i.e. } C = R+R' = P \qquad (8)$$

For any intermediate instance, the complete computation would be difficult to carry out owing to the hyperstatic character of the system. However, it can be said that owing to the linear character of the elastic forces involved the expression for the compression force C would be of the linear form indicated above as relation 6.

The same would be true if instead of the single symmetrical pair of end supports 21, 21', there were provided more than one symmetrical pairs of flexible supports on opposite sides of the central dynamometric support 23.

In the embodiment of the invention shown in FIG. 6, the lower beam 9 carrying the strain gauge 14 at its central portion, is supported on a central leg 25, hinged to the beam at its top, and the two end legs 24 and 24', hinged to the beam at their upper ends and hinged to the ground at their foot. It will be understood that any one of the three legs 24, 24', 25, may be fixedly secured at one of its ends in order to ensure that the resulting assembly is undeformable. As here shown, it is the central leg 25 that is thus fixed. The lower beam 9 is interconnected with the upper or carrier beam 2 by means of four intermediate supports 27, 28, 28', 27'. Here again it will be noted that a single one of these four supports, specifically the support 28' as here shown, is fixedly secured at its lower end (rather than being hinged), in order to impart undeformability. The upper support legs 27, 28, 28', 27' are disposed symmetrically with regard to the vertical midplane $xx$ and, moreover, are positioned at points so selected that the influence of a load transferred thereat to the lower beam 9 generates an equal bending moment component at the centre of the lower beam, i.e. an equal response from strain gauge 14, for each of the four upper supporting legs. It will then be evident that the bending moment of beam 9 at its central section, and hence the response of strain-gauge 14, will be a function only of the sum of the forces transferred from the upper beam 2, and hence equal to the load applied to the carrier beam 2 irrespective of the load's position.

FIG. 7 illustrates a system according to the invention for separately weighing the two wheel loads on each of the successive axles of a railroad train or the like. The system includes two separate weighing assemblies each generally similar to the one shown in FIG. 1. The two similar assemblies are designated with the same reference numerals as in FIG. 1 followed by letters A and B respectively. The weighing assemblies are interposed in the two rails, 1A and 1B, of the railroad track, so as to be traversed by the two wheels such as 31A and 31B of each wheel axle 32 of the train. The gaps between the rails and the weighing beams 2A, 2B at each end weighing device are bridged by taperpoint type joints such as 30, of a type conventional in railroad construction.

The strain gauges 14A, 14B may be of any type capable of delivering an electric signal proportional to the strain sensed by the gauge. One known type of strain gauge that may be successfully used is the vibrating-string type, in which the strain applied to the gauge causes a variation in the frequency of a sustained alternating output signal generated by an electromagnet associated with the vibratory string of the strain gauge. The signals generated by the respective strain gauges 14A, 14B are applied by conductors 24A, 24B to the two inputs of an amplifier unit 25, which may also include electronic circuitry for sustaining the vibrations of the respective strain gauges. The amplified signals are applied to further circuitry in which the frequencies of the signals are determined by any suitable means, as by generating voltages proportional to the frequencies, or by digitizing the frequency signals and evaluating the frequencies by pulse counting techniques. The resulting signals are passed to an output circuit 27 which may display and/or record the results in the form of graphs, printed tabulations, or in other form. In one advantageous application of the system, the circuit chain 25–26–27 may be arranged merely to compare the loads $P_A$ and $P_B$ sensed simultaneously by the two strain gauges and operate a suitable alarm or safety device in case the two loads simultaneously sensed differ by more than a prescribed amount in one or the other sense. In such case the unit 26 may represent a voltage (or frequency) comparator and the unit 27 may represent an alarm device.

FIG. 8 illustrates another embodiment of the invention which differs from the embodiments so far described in that the geometric relation of the carrier beam 2 and the weighing beam 9 is reversed. Here the weighing beam 9 is above, and is supported by its end pivots such as 12 from the upper ends of legs or towers 10 and 10' upstanding from the banks of a shallow excavation. The carrier beam 2 is below the weighing beam and is suspended therefrom by means of the two supports 5 and 5' pivoted at both ends of the respective beams 2 and 9. The strain gauge 14 is connected to the midarea of the weighing beam 9. The apparatus operates in a manner exactly similar to that of FIG. 1. It will be noted that here the geometry is such that the system is stable without requiring other than hinged connections between the members. Of course the towers 10 and 10' and supports 5 and 5' should be long enough to provide the necessary clearance below the weighing beam 9 for the passing of the loads below it over the track 1 and the surface of carrier beam 2.

Various other embodiments and modifications of the invention may be conceived without departing from the scope thereof. Thus the track 1, instead of being laid over the surface of the ground, as shown, with the loads being supported by wheels above the ground, may be an overhead track, in the nature of monorail or cableway, and the loads may be suspended beneath the track. The modifications to be effected in the structure of the invention in order to conform with such a general arrangement will be readily apparent from the foregoing disclosure.

What I claim is:

1. Apparatus for weighing loads while moving along a ground supported track, comprising: a rigid carrier beam; symmetric with respect to a vertical transverse mid-plane and being interposed in an interruption in said track and arranged for a load to move therealong in substantial continuity with the movement of said load along the track ahead of and beyond the interruption; elastically deformable weighing means substantially symmetric with respect to said vertical mid-plane and including a beam system extending parallel to and vertically spaced from said carrier beam, at least a first vertical strut member connecting the weighing means to the ground for the support thereof, second vertical strut members connecting said carrier beam with said beam system, said first and second strut members being respectively symmetrically arranged with respect to said mid-plane but at different distances therefrom, and dynamometer means connected with said weighing means for indicating deformation thereof at said mid-plane, and wherein said first and second vertical strut members are hingedly connected at both their ends excepting for at least one of said second strut members and excepting for said first strut member in the instance in which only one thereof is employed or at least one said first strut member in the instance in which more than one thereof is employed.

2. Apparatus according to claim 1, wherein the strut hinged connections include metal blocks of generally parallelopipedic shape having slots extending thereinto from opposite sides of the block so as to leave a relatively narrow neck of metal between the bottom ends of the slots, thereby defining two thick legs capable of limited relative rotation with respect to each other under load, and means fixedly securing each of said legs to a related structural member.

3. Apparatus for weighing the individual wheel loads of moving vehicles, comprising ground supported tracks along which the opposite-side wheels of a vehicle are respectively movable, interruptions in transversely registering relation in said tracks, and a pair of similar weighing apparatus units interposed in said interruptions each comprising a carrier beam arranged to have a respectively related one of the two opposite side wheels of a common axle of the vehicle to move therealong in substantial continuity with the movement of said wheels along the tracks ahead of and beyond the interruptions, elastically deformable weighing means, means connecting said weighing means with ground and with the related beam for the transfer of forces in each unit from the beam to the weighing means and thence to ground, said beam, weighing means and connecting means in each unit being generally symmetrically arranged with regard to a vertical plane of symmetry transverse to the tracks, and dynamometer means connected with the weighing means in each unit for indicating the deformations thereof at said plane of symmetry in response to the wheels moving along said beams, and common output means connected to both dynamometer means for processing said indications.

4. Apparatus according to claim 3, wherein said common output device includes a comparator for sensing a difference between the loads of two wheels moving simultaneously along the carrier beams of both said units.

5. Apparatus for weighing loads while moving along a ground supported track, comprising: a rigid carrier beam symmetric with respect to a vertical transverse midplane and interposed in an interruption in said track and arranged for a load to move therealong in substantial continuity with the movement of said load along the track ahead of and beyond the interruption; a second beam extending parallel to and vertically spaced from said carrier beam and symmetric with respect to said mid-plane; vertical strut members connecting said carrier and second beams, said members being symmetrically spaced apart on either side of said mid-plane; dynamometer means supporting said second beam in said mid-plane; and similar spring means symmetrically arranged with respect to said mid-plane for connecting both ends of said second beam with the ground.

6. Apparatus for weighing loads moving along a ground supported track, comprising: a rigid carrier beam symmetric with respect to a vertical transverse mid-plane and interposed in an interruption in said track and arranged for a load to move therealong in substantial continuity with the movement of said load along the track ahead of and beyond the interruption; a first ground fixed base located on one side of said mid-plane, a first cantilever beam portion extending from said first base, parallel to and vertically spaced from said carrier beam, towards the other side of said mid-plane; two second ground fixed bases located on the other side of said mid-plane at the same distance therefrom as said first base, a second cantilever beam portion extending from each said second bases towards said one side of said mid-plane, both second cantilever beam portions being located on either side of said first cantilever beam portion and said second beam portions being jointly equivalent in their capacity for flexional deformation to the capacity of said first beam portion; and dynamometer means symmetrically arranged with respect to said mid-plane having respective parts connected with said first beam portion and with both said second beam portions.

References Cited

UNITED STATES PATENTS

| | | | |
|---|---|---|---|
| 1,352,441 | 9/1920 | Epright et al. | 177—134 |
| 3,101,800 | 8/1963 | Raskin. | |

FOREIGN PATENTS 926,045  3/1955  Germany.

RICHARD B. WILKINSON, *Primary Examiner.*

G. H. MILLER, *Assistant Examiner.*